(12) United States Patent
Crawford et al.

(10) Patent No.: US 11,167,891 B2
(45) Date of Patent: Nov. 9, 2021

(54) BOTTLE CAP FOR DISPENSING LIQUID

(71) Applicant: Colgate-Palmolive Company, New York, NY (US)

(72) Inventors: John Crawford, Mahopac, NY (US); Michael Paul Robinson, II, Brooklyn, NY (US)

(73) Assignee: Colgate-Palmolive Company, New York, NY (US)

( * ) Notice: Subject to any disclaimer, the term of this patent is extended or adjusted under 35 U.S.C. 154(b) by 30 days.

(21) Appl. No.: 16/628,717

(22) PCT Filed: Jul. 5, 2017

(86) PCT No.: PCT/US2017/040654
§ 371 (c)(1),
(2) Date: Jan. 6, 2020

(87) PCT Pub. No.: WO2019/009887
PCT Pub. Date: Jan. 10, 2019

(65) Prior Publication Data
US 2020/0189804 A1    Jun. 18, 2020

(51) Int. Cl.
*B65D 41/26*    (2006.01)
*B65D 41/08*    (2006.01)
*G01F 19/00*    (2006.01)

(52) U.S. Cl.
CPC ............ *B65D 41/26* (2013.01); *B65D 41/08* (2013.01); *G01F 19/00* (2013.01)

(58) Field of Classification Search
CPC .... B65D 47/123; B65D 41/26; B65D 50/046; B65D 41/08

USPC .......................... 215/230, 329, 365, 228, 212
See application file for complete search history.

(56) References Cited

U.S. PATENT DOCUMENTS

| 4,566,508 A | * | 1/1986 | Bowyer | ................. | B65D 41/26 141/381 |
| 4,892,126 A | * | 1/1990 | Bucheler | ................ | B65D 41/26 141/381 |
| 5,108,009 A | * | 4/1992 | Davidson | ............... | B65D 47/06 222/109 |

(Continued)

FOREIGN PATENT DOCUMENTS

| CH | 690765 | | 1/2001 | | |
| CH | 690765 A5 | * | 1/2001 | ............. | B65D 41/26 |

(Continued)

OTHER PUBLICATIONS

International Search Report and Written Opinion of the International Searching Authority in International Application No. PCT/US2017/040654, dated Mar. 1, 2018.

*Primary Examiner* — J. Gregory Pickett
*Assistant Examiner* — Tia Cox (57) ABSTRACT

A cap 120 for a bottle 110 includes an upper portion 130 and a lower portion 140. The upper portion is configured to be positioned on an exterior of the bottle when the cap is engaged with the bottle. The lower portion is configured to be positioned at least partially within the bottle when the cap is engaged with the bottle. A lower end of the lower portion includes a first perimeter portion 150 and a second perimeter portion 151. A first distance between the upper portion and the first perimeter portion is different than a second distance between the upper portion and the second perimeter portion.

18 Claims, 11 Drawing Sheets

(56) References Cited

U.S. PATENT DOCUMENTS

| | | | | |
|---|---|---|---|---|
| 5,251,788 A * | 10/1993 | Moore | ............... | B65D 41/26 |
| | | | | 215/330 |
| 5,431,306 A * | 7/1995 | Reid | ............... | B65D 47/06 |
| | | | | 222/109 |
| 5,462,202 A * | 10/1995 | Haffner | ............... | B65D 47/06 |
| | | | | 222/109 |
| 5,597,090 A * | 1/1997 | Leahy | ............... | B65D 47/06 |
| | | | | 222/1 |
| 5,865,331 A * | 2/1999 | Jacobs | ............... | B65D 41/265 |
| | | | | 215/228 |
| 8,651,304 B2 * | 2/2014 | Skillin | ............... | B65D 47/123 |
| | | | | 215/219 |
| 9,045,261 B2 * | 6/2015 | Chawla | ............... | C11D 17/046 |
| 9,637,286 B2 | 5/2017 | Hertzog et al. | | |
| 2002/0070250 A1 | 6/2002 | Delage | | |
| 2005/0139568 A1 * | 6/2005 | Falk | ............... | B65D 23/10 |
| | | | | 215/12.2 |
| 2005/0139609 A1 * | 6/2005 | Giblin | ............... | B65D 41/26 |
| | | | | 222/109 |
| 2007/0257057 A1 * | 11/2007 | Molloy | ............... | B65D 23/065 |
| | | | | 222/109 |
| 2008/0164282 A1 * | 7/2008 | Szekely | ............... | B65D 47/123 |
| | | | | 222/111 |
| 2009/0045224 A1 * | 2/2009 | Faaborg | ............... | B65D 47/06 |
| | | | | 222/111 |
| 2009/0314738 A1 * | 12/2009 | Siacunco | ............... | B65D 47/42 |
| | | | | 215/228 |
| 2011/0179587 A1 * | 7/2011 | Chawla | ............... | A46B 11/0013 |
| | | | | 8/137 |
| 2011/0226721 A1 * | 9/2011 | Horstman | ............... | B65D 47/122 |
| | | | | 215/230 |
| 2011/0311296 A1 * | 12/2011 | Chawla | ............... | A46B 11/0006 |
| | | | | 401/137 |
| 2014/0326628 A1 * | 11/2014 | Fox | ............... | B65D 41/04 |
| | | | | 206/459.5 |

FOREIGN PATENT DOCUMENTS

| | | |
|---|---|---|
| CN | 1697757 | 11/2005 |
| CN | 2782585 | 5/2006 |
| EP | 0328865 | 8/1989 |
| EP | 2239205 | 10/2010 |

* cited by examiner

BOTTLE CAP FOR DISPENSING LIQUID

BACKGROUND

A bottle having, for example, a detergent or a fabric softener therein, may have a cap threadably secured thereto. The cap may include an annular shaft, referred to as a chimney, that extends down into the bottle when the cap is threadably secured to the bottle. When the cap is removed, the cap may be turned upside-down, and the user may pour the liquid (e.g., detergent, fabric softener, etc.) from the bottle into the chimney. The user may then turn the cap right-side up again to pour the liquid from the cap into, for example, a washing machine.

Occasionally, when the bottle is initially filled with the liquid to a maximum fill level (e.g., by the manufacturer), and the chimney is inserted into the bottle as the cap is threadably secured to the bottle, an air bubble may be trapped in the chimney. This may displace a portion of the liquid, causing the level of the liquid to rise above the maximum fill level of the bottle, which may allow the liquid to seep through the threads between the bottle and the cap. It would therefore be desirable to have an improved cap that may prevent the liquid from overflowing.

BRIEF SUMMARY

A cap for a bottle is disclosed. The cap includes an upper portion and a lower portion. The upper portion is configured to be positioned on an exterior of the bottle when the cap is engaged with the bottle. The lower portion is configured to be positioned at least partially within the bottle when the cap is engaged with the bottle. A lower end of the lower portion includes a first perimeter portion and a second perimeter portion. A first distance between the upper portion and the first perimeter portion is different than a second distance between the upper portion and the second perimeter portion.

In another embodiment, the cap includes an upper portion and a lower portion. The upper portion is configured to be positioned on an exterior of the bottle when the cap is engaged with the bottle. The lower portion is configured to be positioned at least partially within the bottle when the cap is engaged with the bottle, wherein a lower end of the lower portion includes a first perimeter portion and a second perimeter portion, wherein a first distance between the upper portion and the first perimeter portion is greater than a second distance between the upper portion and the second perimeter portion, and wherein the second perimeter portion comprises a radius of curvature that is oriented at an angle from about 20° to about 70° with respect to a central axis through the cap such that the second distance varies within the second perimeter portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Figure 1:
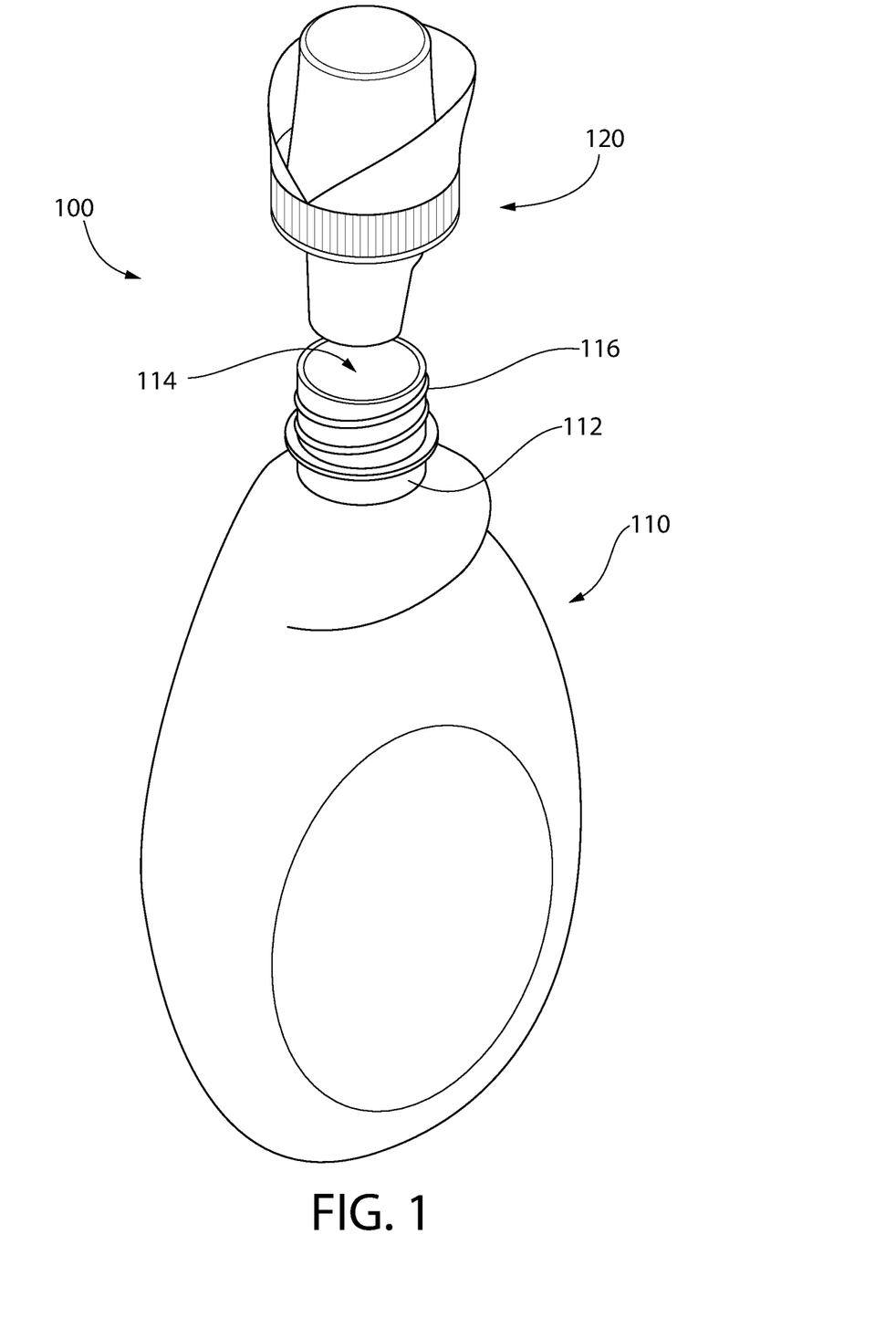
FIG. 1 depicts a perspective view of an example of a dispenser, including a bottle with a cap configured to be threadably secured to the bottle, according to an embodiment.

FIG. 1 depicts a perspective view of an example of a dispenser 100, including a bottle 110 with a cap 120 configured to be threadably secured to the bottle 100, according to an embodiment. The bottle 110 may define an internal volume having a liquid stored therein. The liquid may be or include a cleaning liquid or a clothes-washing liquid, such as a laundry detergent, a fabric softener, or any other liquid that needs to be measured/dosed. The bottle 110 may include a neck 112 at an upper end thereof. An opening 114 may extend through the neck 112 and provide a path of fluid communication between the internal volume and the exterior of the bottle 110. The neck 112 may have external threads 116 on an outer surface thereof.

Figure 2:
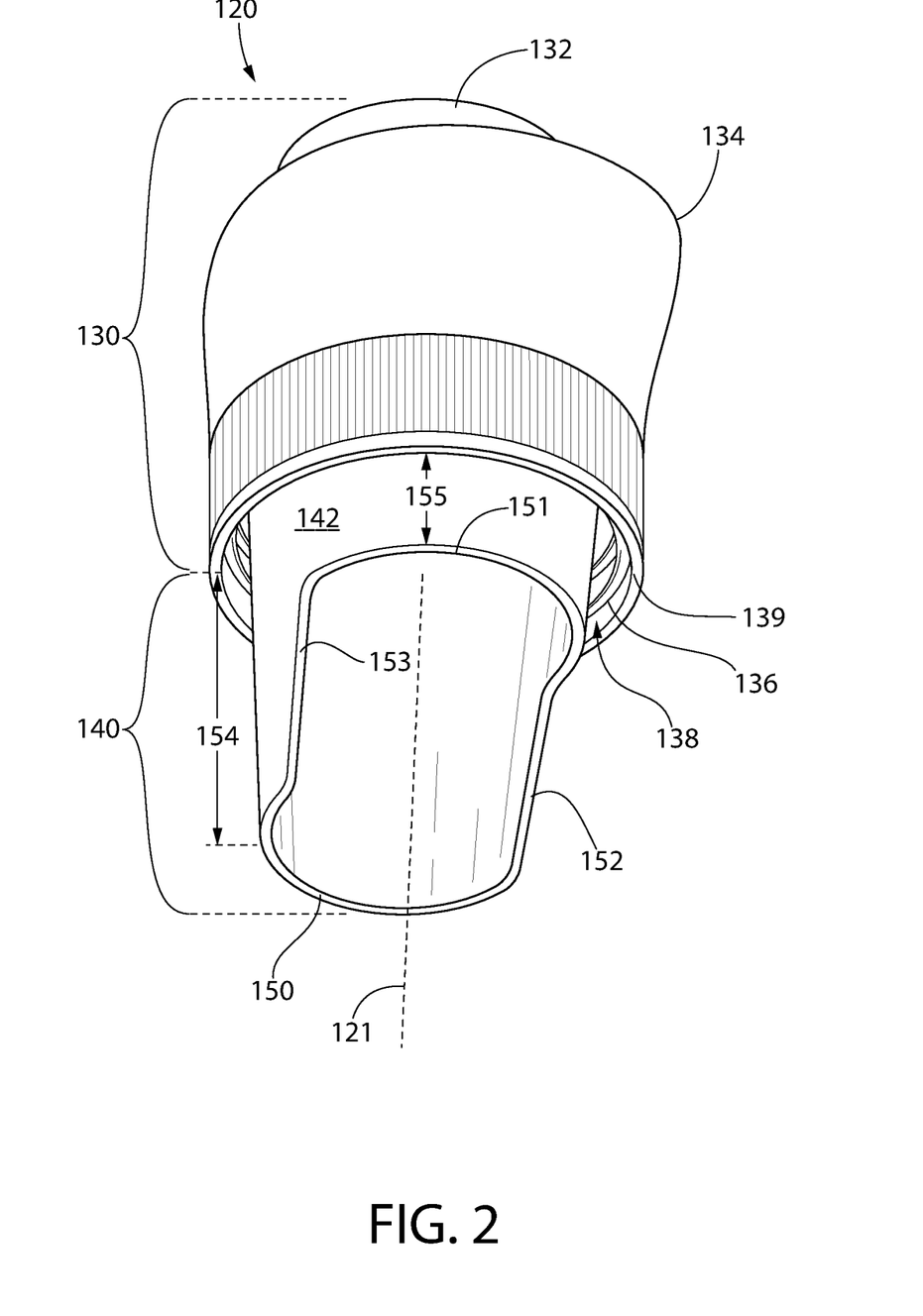
FIG. 2 depicts a perspective view of the cap while removed from the bottle, according to an embodiment.

FIG. 2 depicts a perspective view of the cap 120 while removed from the bottle 110, according to an embodiment. The cap 120 may include an upper portion 130 and a lower portion 140. The upper portion 130 may be configured to be positioned exterior to the bottle 110 when the cap 120 is threadably engaged with the bottle 110. The lower portion 140 may be configured to be positioned at least partially within the bottle 110 (e.g., at least partially within the neck 112 of the bottle 110), when the cap 120 is threadably engaged with the bottle 110. The upper portion 130 may include an inner, annular portion 132 and an outer portion 134. The upper portion 130 may have internal threads 136 on an inner surface thereof. The internal threads 136 of the cap 120 may be configured to engage with the external threads 116 of the neck 112 of the bottle 110 to secure the cap 120 to the bottle 110. It is contemplated that in some embodiments the cap 120 is engaged with the bottle 110 via other coupling means, such as frictional fit, snap fit, etc.

The lower portion 140 of the cap 120 may be coupled to or integral with the upper portion 130 of the cap 120. The lower portion 140 of the cap 120 may at least partially axially-overlap with the upper portion 130 of the cap 120. An annular gap 138 may be defined between the upper and lower portions 130, 140 of the cap 120 in the axially-overlapping region. The neck 112 of the bottle 110 may fit within the annular gap 138 when the cap 120 is secured to the bottle 110.

The lower portion 140 of the cap 120 may be or include an annular shaft, also referred to as a chimney, 142. The annular shaft or chimney 142 may have a three-dimensional geometry. In the example shown, the chimney 142 may have the shape of a hollow, truncated cone that has portion of its side surface removed so as to create an opening or an open side portion in the chimney 142. A lower edge or end of the lower portion 140 (e.g., the chimney 142) may include one or more edge segments or perimeter portions (four are shown: 150-153). The perimeter portions 150-153 (the entire lower edge) may together appear substantially circular when looking at an axial end view of the cap 120 (i.e., the line of sight is aligned with a central axis 121). As shown in this example, however, two or more of the perimeter portions 150-153 may not be in the same plane as one another. More particularly, the axial distances between (e.g., a lower edge or end 139 of) the upper portion 130 and the perimeter portions 150-153 of the lower portion 140 may differ from one another, such that the lower end of the lower portion 140 is not a two-dimensional circle (i.e., the lower edge of the lower portion 140 is not in a single plane). As a result, axial distances between two or more of the perimeter portions 150-153 and a flat base of the bottle 110 may be different from one another when the cap 120 is threadably engaged with the bottle 110.

A first axial distance 154 between the lower end 139 of the upper portion 130 and the first perimeter portion 150 may be from about 2 cm to about 8 cm, about 3 cm to about 7 cm, or about 4 cm to about 6 cm. The first perimeter portion 150 may be or span from about 90° to about 270°, about 120° to about 240°, or about 150° to about 210° around the central axis 121. A second axial distance 155 between the lower end 139 of the upper portion 130 and the second perimeter portion 151 may be may be less than the first axial distance 154. For example, the second axial distance 155 may be from about 1 cm to about 4 cm, about 1 cm to about 3 cm, or about 1 cm to about 2 cm. The second perimeter portion 151 may be or span from about 45° to about 180°, about 60° to about 150°, or about 75° to about 135° around the central axis 121.

The third perimeter portion 152 may be a transition between the first and second perimeter portions 150, 151. Likewise, the fourth perimeter portion 153 may be a transition between the first and second perimeter portions 150, 151. The third and fourth perimeter portions 152, 153 may each be or span from about 10° to about 90°, about 20° to about 80°, or about 30° to about 70° around the central axis 121. The third and/or fourth perimeter portion(s) 152, 153 may be linear, substantially linear, or curved. When linear, the third and/or fourth perimeter portion(s) 152, 153 may be substantially parallel to the central axis 121. In another embodiment, when linear, third and/or fourth perimeter portion(s) 152, 153 may be oriented at an angle with respect to the central axis 121 from about 1° to about 45°, about 5° to about 30°, or about 10° to about 20°.

When the liquid in the bottle 110 is at or near a max-fill level, (e.g., near the top of the neck 112), the open side portion of the chimney 142, defined by the second, third, and fourth perimeter portions 151-153, may reduce the size of (or prevent) air bubbles from becoming trapped in the lower portion 140 of the cap 120 (i.e., within the chimney 142) when the cap 120 is inserted at least partially into and/or threadably engaged with the bottle 110.

The first perimeter portion 150 may be in a plane that is substantially perpendicular to the central axis 121 through the cap 120. In at least one embodiment, the second perimeter portion 151 may also be in a plane that is substantially perpendicular to the central axis 121, as shown in the example of FIG. 2.

Figure 3:
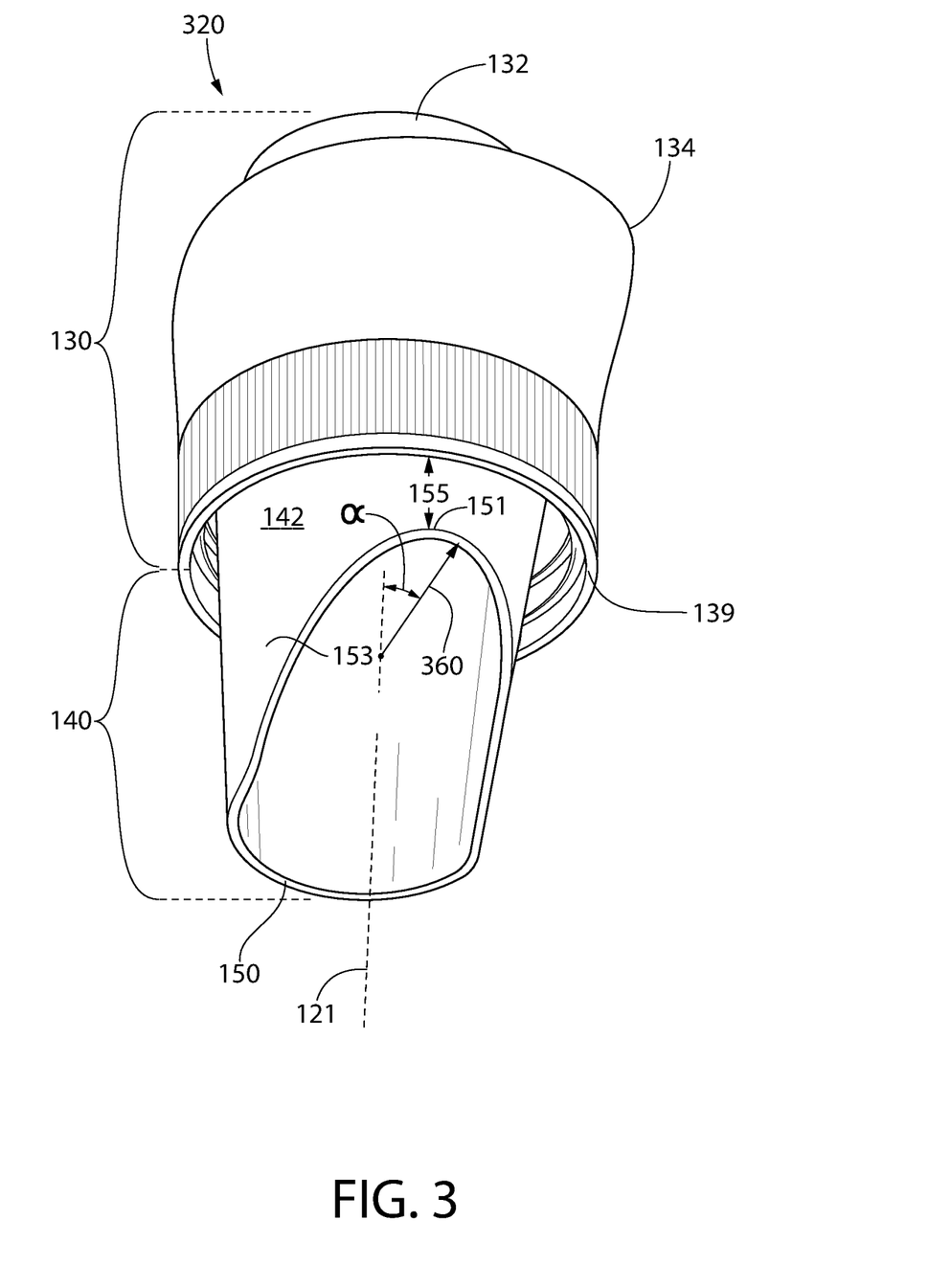
FIG. 3 depicts a perspective view of an example of another cap while removed from the bottle, according to an embodiment.

FIG. 3 depicts a perspective view of an example of another cap 320 while removed from the bottle 110, according to an embodiment. As shown in the example of FIG. 3, in other embodiments, the second perimeter portion 151 may not have a constant second axial distance 155, and thus not be in a single plane that is substantially perpendicular to the central axis 121. Rather, the second axial distance 155 may vary proceeding around the second perimeter portion 151. For example, the second perimeter portion 151 may include a radius of curvature 360. The radius of curvature 360 may originate from the central axis 121. The radius of curvature 360 may not, however, be in a plane that is perpendicular to the central axis 121. Instead, the radius of curvature 360 may be in a plane that is oriented at an angle α with respect to the central axis 121, and the angle α may be from about 10° to about 80° or about 20° to about 70°.

Figure 4:
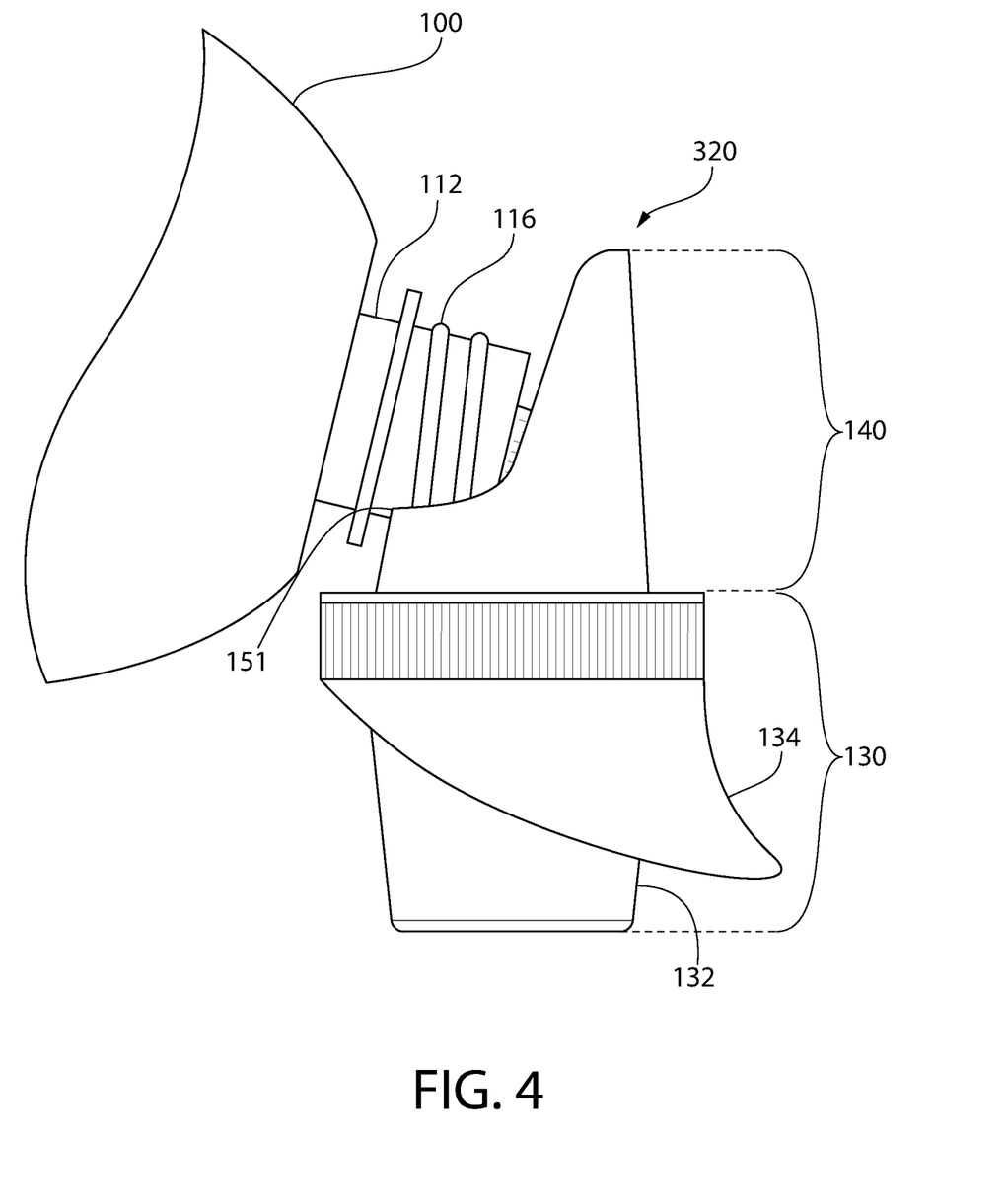
FIG. 4 depicts a perspective view of the cap of FIG. 3 while inverted and with the bottle pouring the liquid into the cap, according to an embodiment.

FIG. 4 depicts a perspective view of the cap 320 of FIG. 3 while inverted and with the bottle 110 pouring the liquid into the cap 320, according to an embodiment. The radius of curvature 360 may be substantially equal to a radius of curvature of the neck 112 of the bottle 110 so that the neck 112 of the bottle 110 may rest on the second perimeter portion 151 when the bottle 110 is positioned to pour the liquid from the bottle 110 into the cap 320. As a result, the second perimeter portion 151 may be sized and shaped to mate with, engage with, accept, or otherwise correspond to the neck 112 of the bottle 110 such that more than a single point on the second perimeter portion 151 is configured to be in contact with the neck 112 of the bottle 110 when the bottle 110 is positioned to pour the liquid from the bottle 110 into the cap 320. This may allow the neck 112 of the bottle 110 to be supported and stabilized by the second perimeter portion 151 of the cap 320 and prevent the liquid from spilling when the bottle 110 is pouring the liquid into the cap 110. For example, the second perimeter portion 151 may contact and/or wrap around at least a portion of the neck 112.

Figure 5A:
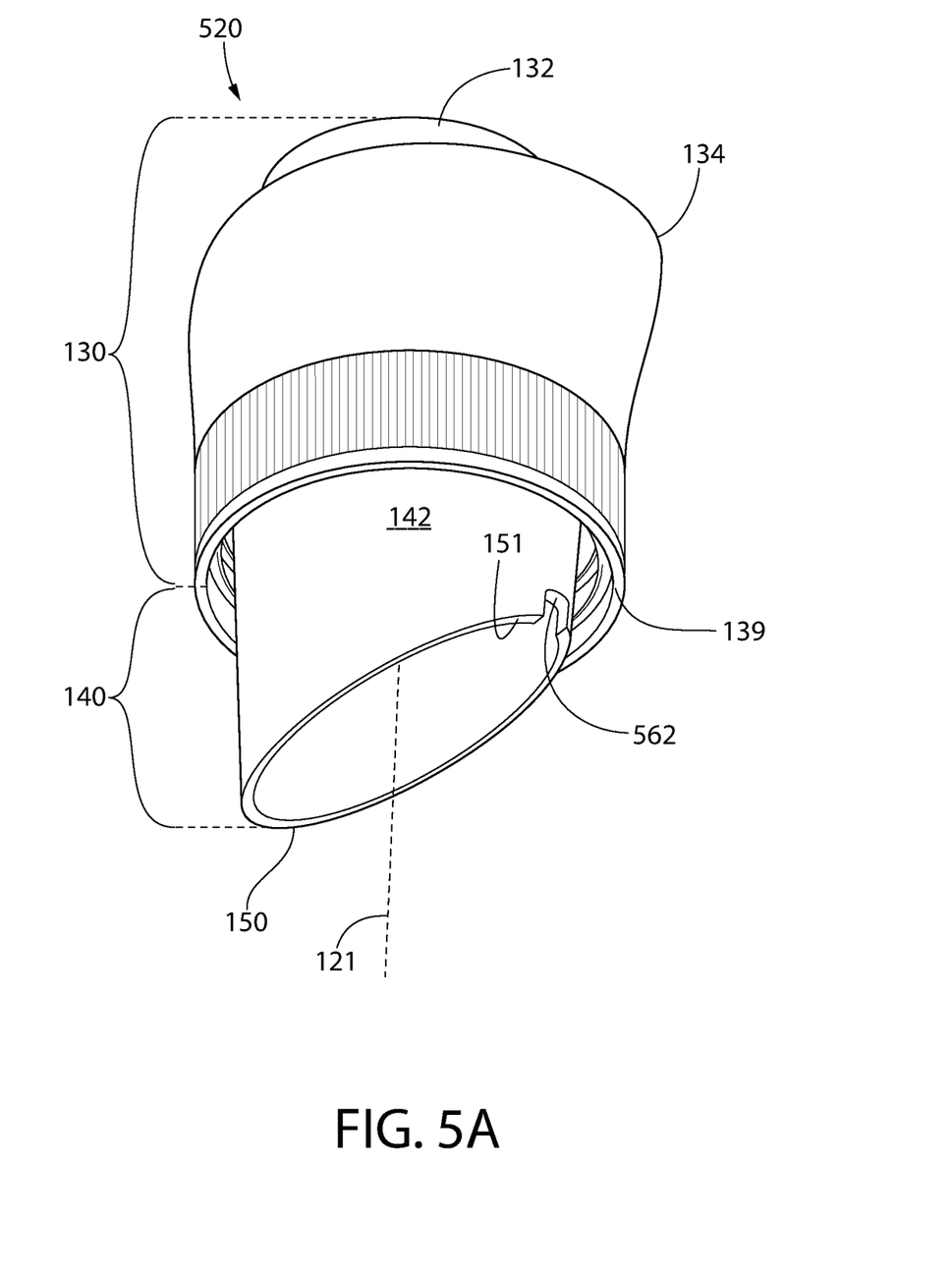
FIG. 5A depicts a perspective view of an example of another cap while removed from the bottle.
Figure 5B:
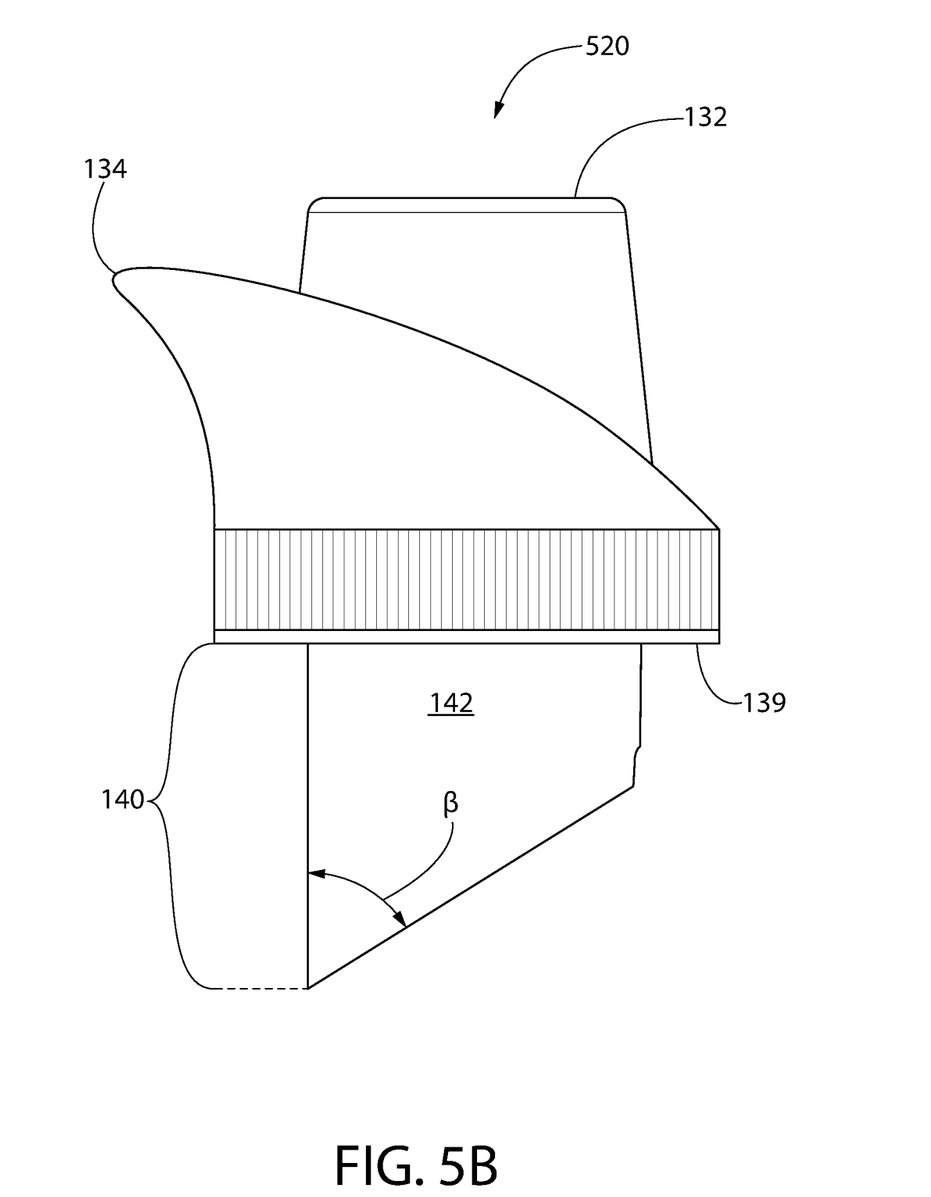
FIG. 5B depicts a side view of the cap in FIG. 5A, according to an embodiment.

FIG. 5A depicts a perspective view of an example of another cap 520 while removed from the bottle 110, and FIG. 5B depicts a side view of the cap 520 in FIG. 5A, according to an embodiment. The lower edge or end of the lower portion 140 may be in a plane that is not perpendicular to the central axis 121. As shown in FIG. 5B, the plane may be oriented at an angle β with respect to the central axis 121, and the angle β may be from about 20° to about 70° or about 30° to about 60°. As a result, the distance between the lower end 139 of the upper portion 130 and the lower end of the lower portion 140 may vary proceeding around the perimeter of the lower end of the lower portion 140. As discussed above, this may reduce the size of (or prevent) air bubbles that may be trapped in the chimney 142.

As shown in FIG. 5A, a rounded or rectangular notch 562 may be formed in the lower end of the lower portion 140. The notch 562 may be positioned proximate to the portion of the perimeter having the shortest distance between the lower end 139 of the upper portion 130 and the lower end of the lower portion 140 (i.e., the second portion of the perimeter 151). As a result, if too much liquid is inadvertently poured into the cap 520 by the user, the liquid may overflow through the notch 562, which may be easier to clean up than if the liquid overflows around a larger portion of the perimeter. In addition, the notch 562 may be used by the user to pour the desired amount of liquid into the cap 520.

Figure 6:
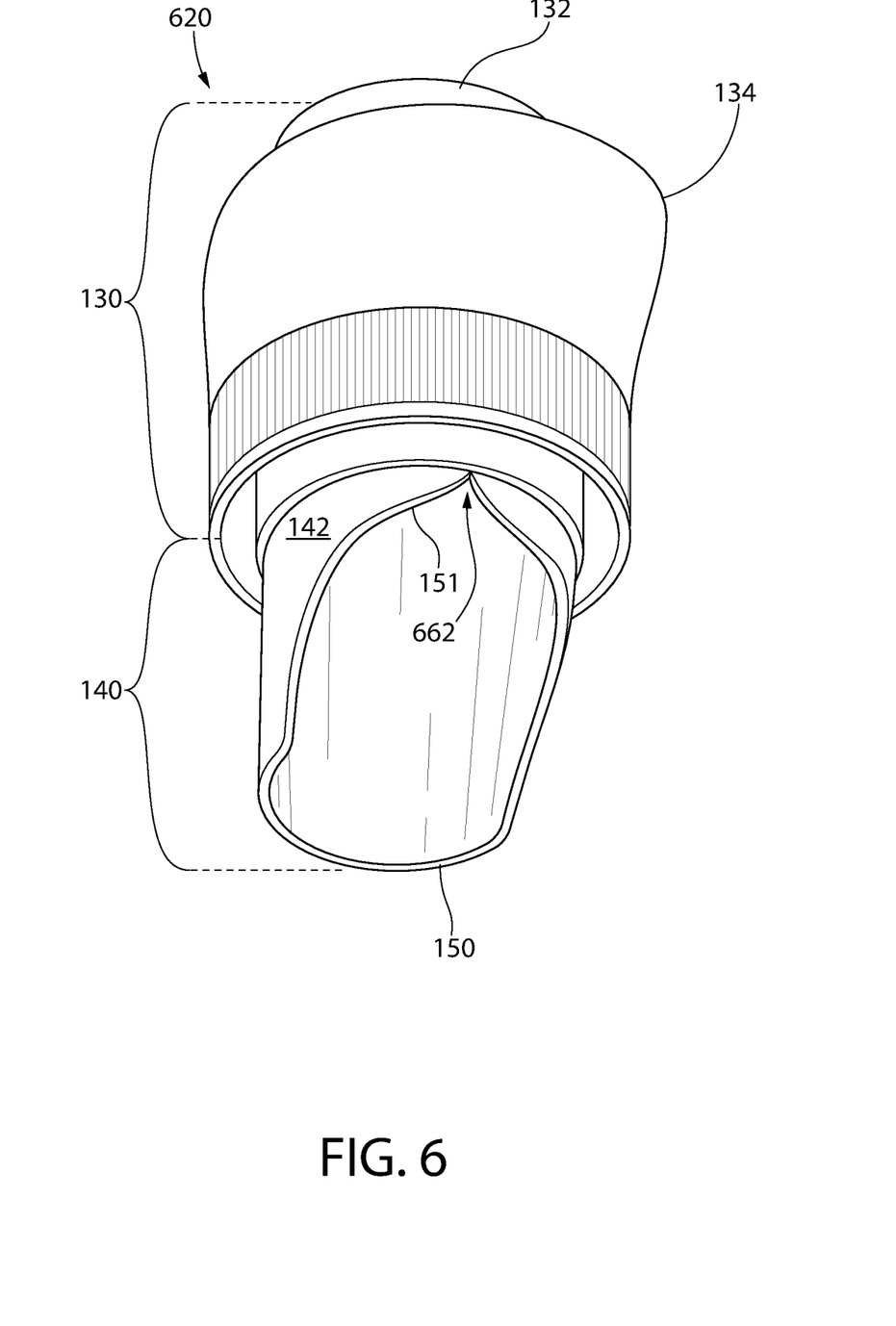
FIG. 6 depicts a perspective view of an example of another cap while removed from the bottle, according to an embodiment.

FIG. 6 depicts a perspective view of an example of another cap 620 while removed from the bottle 110, according to an embodiment. In contrast to the rounded or rectangular notch 562 in FIG. 5A, FIG. 6 shows a substantially V-shaped notch 662 positioned proximate to the portion of the perimeter having the shortest distance between the lower end 139 of the upper portion 130 and the lower end of the lower portion 140 (i.e., the second portion of the perimeter 151). Like the rounded or rectangular notch 562, the V-shaped notch 662 may also make clean-up easier in the event that too much liquid is poured into the cap 620.

Figure 7:
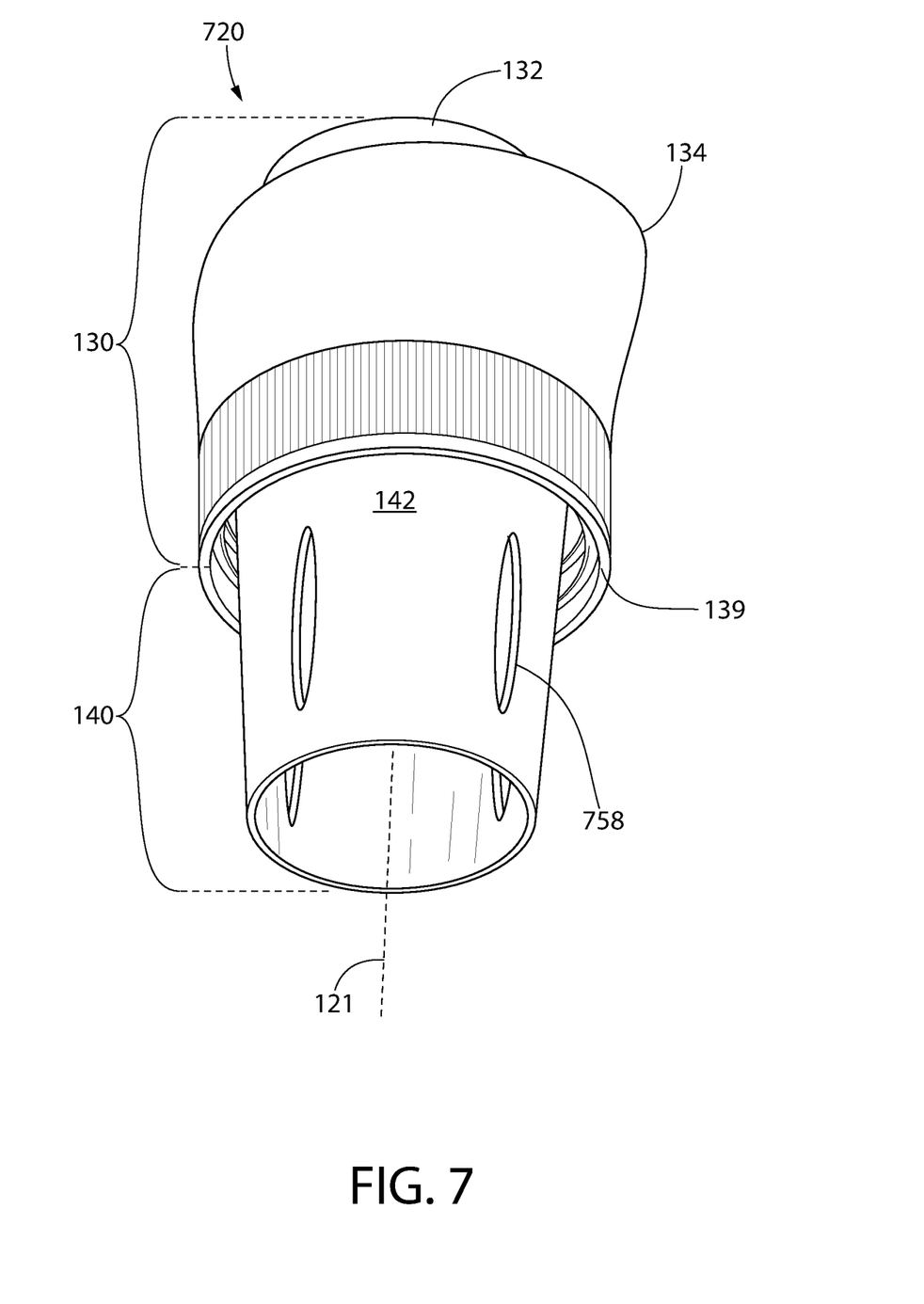
FIG. 7 depicts a perspective view of an example of another cap while removed from the bottle, according to an embodiment.

FIG. 7 depicts a perspective view of an example of another cap 720 while removed from the bottle 110, according to an embodiment. As shown, the axial distance between the lower end 139 of the upper portion 130 and the lower end of the lower portion 140 may be substantially uniform around a circumference of the lower portion 140. However, to reduce the size of (or prevent) air bubbles that may be trapped in the chimney 142, one or more openings 758 may be formed radially-through in the chimney 142. The openings 758 may be circumferentially-offset from one another. The openings 758 may only be formed around a portion of the circumference to prevent the liquid from spilling through the openings 758 when the liquid is poured into the cap 720. For example, the openings 758 may be found in a first 180° portion of the circumference but not in the opposing 180° portion of the circumference. In some embodiments, the openings 758 may be slots that are parallel to the central axis 121.

Figure 8:
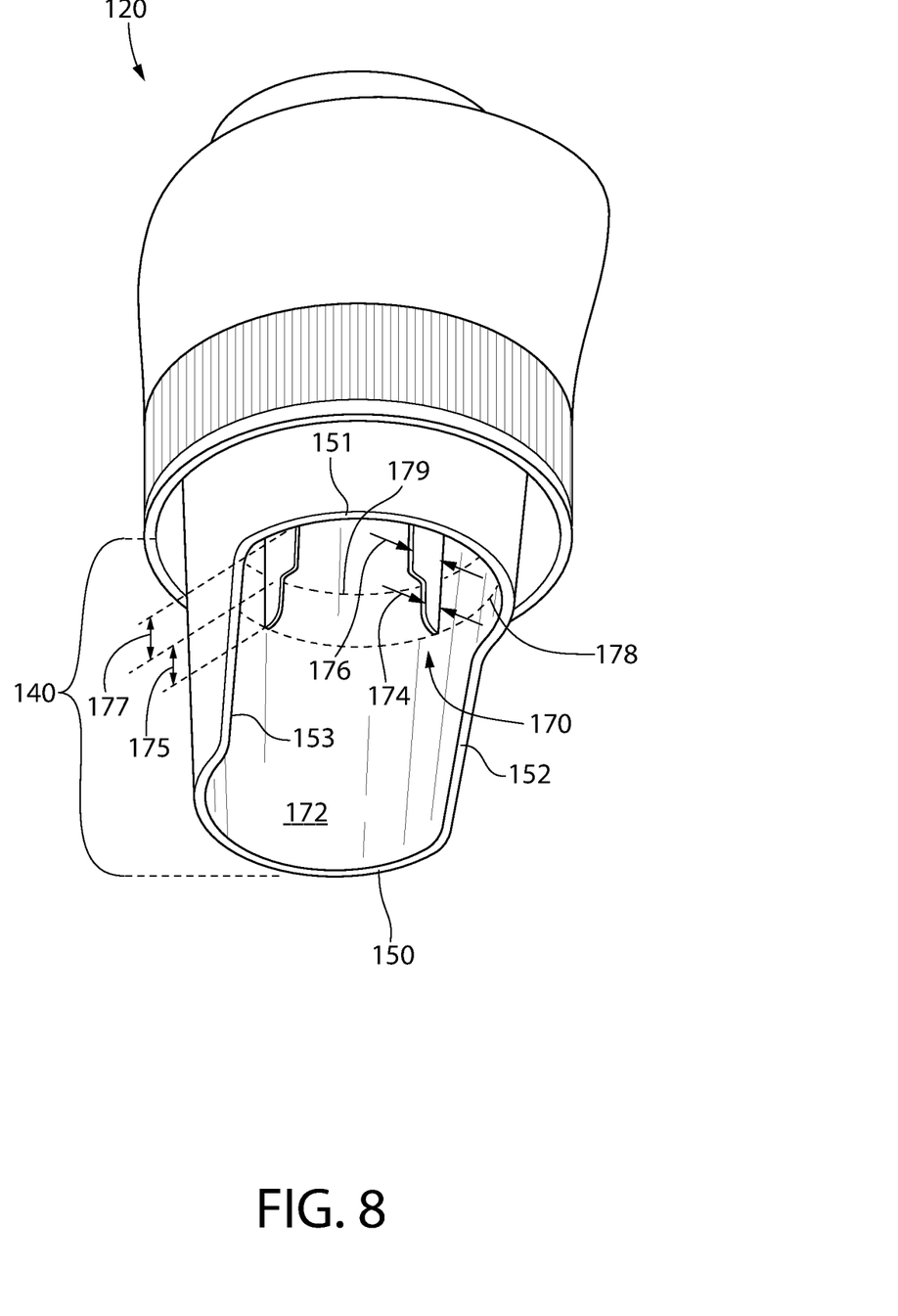
FIG. 8 depicts a perspective view of the cap (of FIG. 2), showing axial ribs on an inner surface of the cap, according to an embodiment.

FIG. 8 depicts a perspective view of the cap 120, showing axial ribs 170 on an inner surface 172 thereof, according to an embodiment. Although the cap 120 is from FIG. 2, it may be appreciated that the axial ribs 170 may also be placed within the caps 320, 520, 620, 720. The ribs 170 may be positioned on the inner surface 172 of the lower portion 140 of the cap 120 (e.g., on the inner surface 172 of the chimney 142). The ribs 170 may protrude radially inward from the inner surface 172. In at least one embodiment (not shown), the ribs 170 may protrude radially inward for a constant distance along the axial length of the ribs 170. In another embodiment, as shown, the distance that the ribs 170 protrude may vary along the axial length of the ribs 170. For example, the ribs 170 may protrude radially inward a first distance 174 along a first portion of the axial length 175 of the ribs 170, a second distance 176 along a second portion of the axial length 177 of the ribs 170, etc. In the example shown, the first portion of the axial length 175 may be positioned closer to the perimeter portions 150-153 of the lower end of the cap 120 than the second portion of the axial length 177. In the example shown, the first distance 174 may be less than the second distance 176. The ribs 170 may serve as visual indicators to help a user pour the desired amount of liquid into the cap 120.

In addition to the axial ribs, one or more secondary visual indicators (two are shown: 178, 179) may also be positioned on the inner surface 172. The secondary visual indicators 178, 179 may be or include annular rings that protrude radially-inward from the inner surface 172. The secondary visual indicators 178, 179 may also help a user pour the desired amount of liquid into the cap 120.

Figure 9:
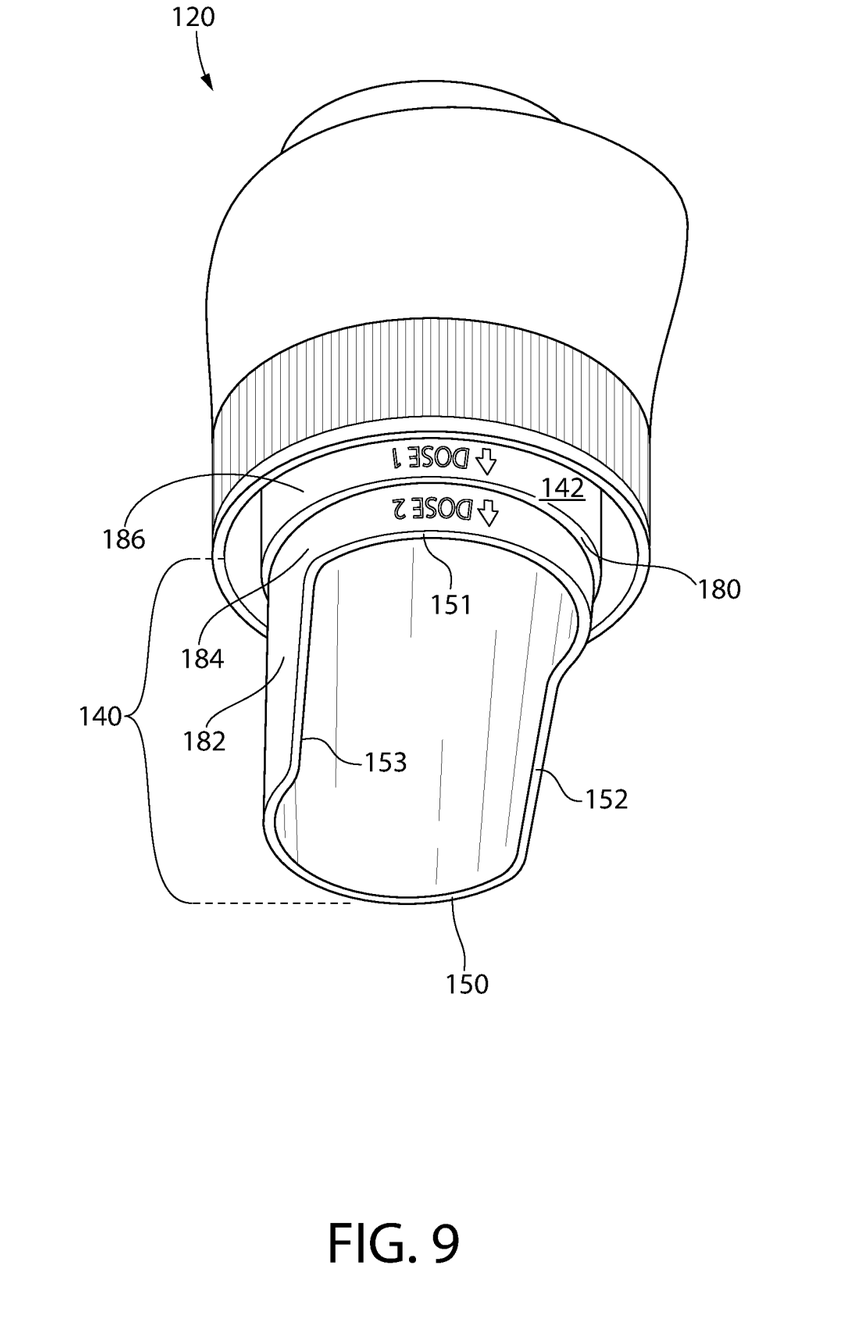
FIG. 9 depicts a perspective view of the cap (of FIG. 2), showing a ledge on an outer surface of the cap, according to an embodiment.

FIG. 9 depicts a perspective view of the cap 120, showing a ledge 180, according to an embodiment. Although the cap 120 is from FIG. 2, it may be appreciated that the ledge 180 may also be placed on the caps 320, 520, 620, 720. As shown in this example, the ledge 180 may be positioned on the outer surface 182 of the lower portion 140 of the cap 120 (e.g., on the outer surface 182 of the chimney 142). The ledge 180 may be defined by a first outer diameter portion 184 and a second outer diameter portion 186 of the outer surface 182. In the example shown, the first outer diameter portion 184 may be positioned closer to the lower end of the cap 120 than the second outer diameter portion 186. In the example shown, the first outer diameter portion 184 has a lesser outer diameter than the second outer diameter portion 186. The ledge 180 may serve as a visual indicator to help a user pour a desired amount of liquid into the cap 120; e.g., into the chimney 142 of the cap 120. As shown, the first outer diameter portion 184 and/or the second outer diameter portion 186 may have characters thereon to indicate the amount of liquid at the ledge 180.

Figure 10:
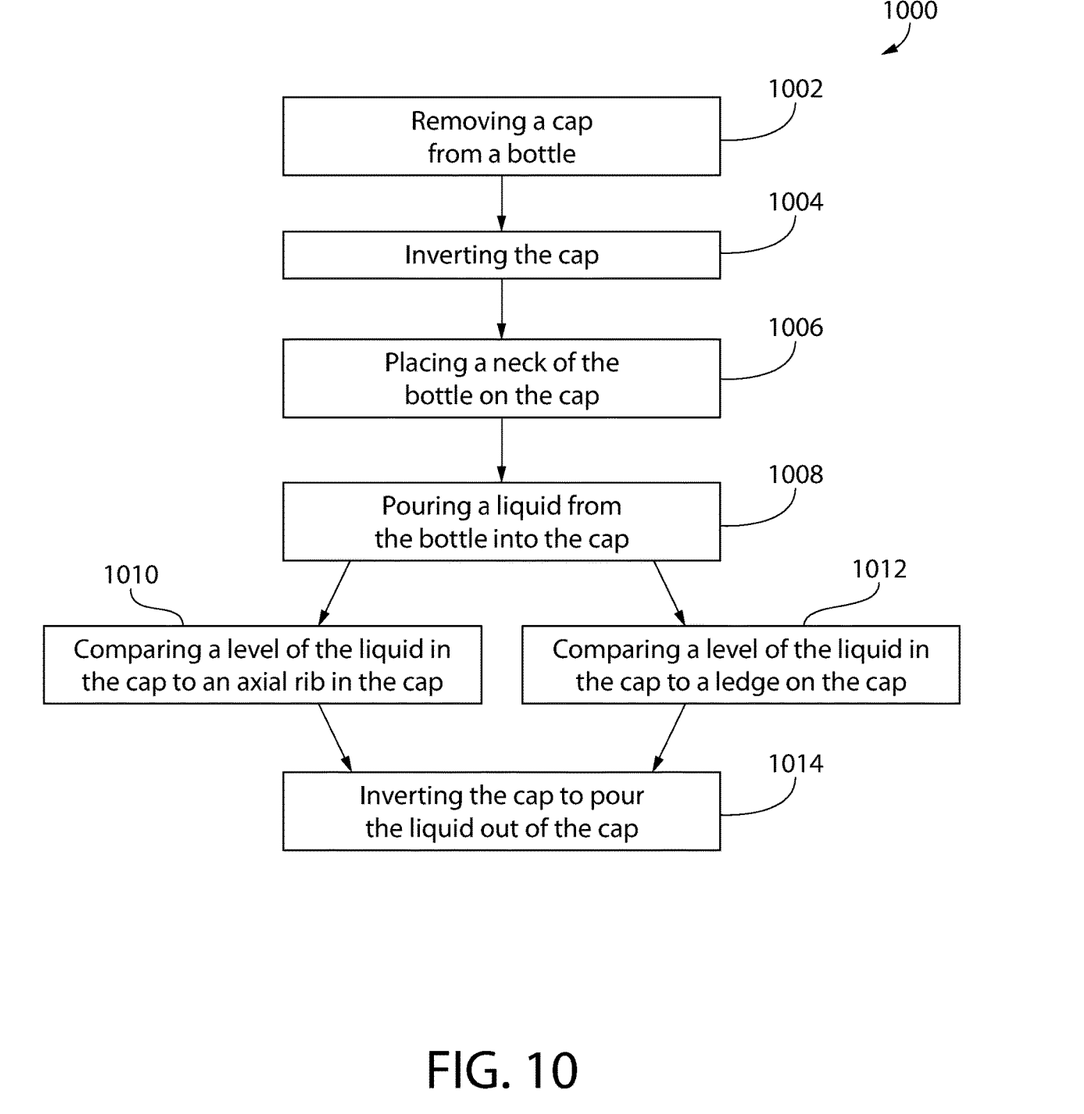
FIG. 10 depicts a flowchart of a method for dispensing liquid from the dispenser, according to an embodiment.

FIG. 10 depicts a flowchart of an example of a method 1000 for dispensing liquid from the dispenser 100, according to an embodiment. The method 1000 may include removing the cap 120 from the bottle 110, as at 1002. The method 1000 may also include inverting the cap 120 (i.e., turning the cap 120 upside-down), as at 1004. The method 1000 may also include placing the neck 112 of the bottle 110 on the cap 120, as at 1006. This may include placing the neck 112 of the bottle 110 onto or into a structure of the cap 120 that is configured to engage with, mate with, accept, or otherwise correspond to the neck 112 of the bottle 110, such as the second perimeter portion 151 of the cap 120. As described above, the second perimeter portion 151 may be shaped and sized to be able to contact and partially enclose at least a portion of the neck 112 (e.g., to contact more than a single point of the neck 112).

The method 1000 may also include pouring the liquid from the bottle 110 into the cap 120, as at 1008, which may include pouring the liquid into the chimney 142 via the opening in the side of the chimney 142. In some implementations, the method 1000 may also include measuring the amount of liquid that has been poured into the cap 120 by comparing the level of the liquid in the cap 120 to axial rib(s) 170 that are in the cap 120, as at 1010. In some implementations, the method 1000 may also or instead include measuring the amount of liquid that has been poured into the cap 120 by comparing the level of the liquid in the cap 120 to a ledge 180 on the cap 120, as at 1012. The method 1000 may also include inverting the cap 120 (i.e., turning the cap right-side up) to pour the measured amount of liquid out of the cap 120, as at 1014, and, for example, into a washing machine.

Embodiments of the disclosure may provide a cap for a bottle. The cap includes an upper portion configured to be positioned on an exterior of the bottle when the cap is engaged with the bottle. The cap also includes a lower portion configured to be positioned at least partially within the bottle when the cap is engaged with the bottle. A lower end of the lower portion includes a first perimeter portion and a second perimeter portion. A first distance between the upper portion and the first perimeter portion is different than a second distance between the upper portion and the second perimeter portion.

Optionally, the upper portion includes an interior surface, and an outer diameter of the lower portion is less than an inner diameter of the interior surface of the upper portion such that an annular gap is defined therebetween. Optionally the lower end includes a three-dimensional geometry. Optionally, the first distance is greater than the second distance, and the first perimeter portion and the second perimeter portion are not in the same plane. Optionally, the second perimeter portion is in a plane that is substantially perpendicular to a central axis through the cap. Optionally, the second perimeter portion includes a radius of curvature that extends through a plane that is not perpendicular to a central axis through the cap. Optionally, the second perimeter portion spans greater than 45° around the central axis through the cap. Optionally, a notch is formed in the second perimeter portion. Optionally, an axial rib that protrudes radially inward from an inner surface of the lower portion. The rib protrudes radially inward: a first radial distance for a first portion of an axial length of the rib, and a second radial distance for a second portion of the axial length of the rib, wherein the first portion of the axial length is positioned closer to the lower end of the lower portion than the second portion of the axial length. The first radial distance is less than the second radial distance. Optionally, an outer surface of the lower portion includes a first diameter portion and a second diameter portion that define a ledge therebetween, and the ledge is configured to be used to measure an amount of liquid in the cap.

Embodiments of the disclosure may also provide a cap for a bottle where an upper portion of the cap is configured to be positioned on an exterior of the bottle when the cap is engaged with the bottle, and a lower portion of the cap is configured to be positioned at least partially within the bottle when the cap is engaged with the bottle. A lower end of the lower portion includes a first perimeter portion and a second perimeter portion. A first distance between the upper portion and the first perimeter portion is greater than a second distance between the upper portion and the second perimeter portion. The second perimeter portion includes a radius of curvature that is oriented at an angle from about 20° to about 70° with respect to a central axis through the cap such that the second distance varies within the second perimeter portion.

Optionally, the upper portion includes an interior surface, and an outer diameter of the lower portion is less than an inner diameter of the interior surface of the upper portion such that an annular gap is defined therebetween. Optionally, the first perimeter portion is in a plane that is substantially perpendicular to the central axis. Optionally, wherein the lower end is in a single plane. Optionally, the lower end is not in a single plane. Optionally, the second perimeter portion spans greater than 45° around the central axis through the cap. Optionally, a notch is formed in the second perimeter portion. Optionally, an opening is defined radially-through the lower portion. Optionally, an axial rib that protrudes radially inward from an inner surface of the lower portion. The rib protrudes radially inward: a first radial distance for a first portion of an axial length of the rib, and a second radial distance for a second portion of the axial length of the rib, wherein the first portion of the axial length is positioned closer to the lower end of the lower portion than the second portion of the axial length. The first radial distance is less than the second radial distance. Optionally, an outer surface of the lower portion includes a first diameter portion and a second diameter portion that define a ledge therebetween, and the ledge is configured to be used to measure an amount of liquid in the cap.

What is claimed is:

1. A cap for a bottle, comprising:
   an upper portion configured to be positioned on an exterior of the bottle when the cap is engaged with the bottle; and
   a lower portion configured to be positioned at least partially within the bottle when the cap is engaged with the bottle, wherein a lower end of the lower portion includes a first perimeter portion and a second perimeter portion, and wherein a first distance between the upper portion and the first perimeter portion is different than a second distance between the upper portion and the second perimeter portion;
   wherein an outer surface of the lower portion comprises a first diameter portion and a second diameter portion that define a ledge therebetween, and wherein the ledge is configured to be used to measure an amount of liquid in the cap.

2. The cap of claim 1, wherein the upper portion comprises an interior surface, and wherein an outer diameter of the lower portion is less than an inner diameter of the interior surface of the upper portion such that an annular gap is defined therebetween.

3. The cap of claim 1, wherein the lower end comprises a three-dimensional geometry.

4. The cap of claim 1, wherein the first distance is greater than the second distance, and wherein the first perimeter portion and the second perimeter portion are not in the same plane.

5. The cap of claim 1, wherein the second perimeter portion is in a plane that is substantially perpendicular to a central axis through the cap.

6. The cap of claim 1, wherein the second perimeter portion comprises a radius of curvature that extends through a plane that is not perpendicular to a central axis through the cap.

7. The cap of claim 1, wherein the second perimeter portion spans greater than 45° around the central axis through the cap.

8. The cap of claim 1, wherein a notch is formed in the second perimeter portion.

9. The cap of claim 1, further comprising an axial rib that protrudes radially inward from an inner surface of the lower portion, wherein the rib protrudes radially inward:
   a first radial distance for a first portion of an axial length of the rib; and
   a second radial distance for a second portion of the axial length of the rib, wherein the first portion of the axial length is positioned closer to the lower end of the lower portion than the second portion of the axial length, and wherein the first radial distance is less than the second radial distance.

10. A cap for a bottle, comprising:
    an upper portion configured to be positioned on an exterior of the bottle when the cap is engaged with the bottle; and
    a lower portion configured to be positioned at least partially within the bottle when the cap is engaged with the bottle, wherein a lower end of the lower portion includes a first perimeter portion and a second perimeter portion, wherein a first distance between the upper portion and the first perimeter portion is greater than a second distance between the upper portion and the second perimeter portion, and wherein the second perimeter portion comprises a radius of curvature that is oriented at an angle from about 20° to about 70° with respect to a central axis through the cap such that the second distance varies within the second perimeter portion;

wherein the lower end is not in a single plane.

11. The cap of claim 10, wherein the upper portion comprises an interior surface, and wherein an outer diameter of the lower portion is less than an inner diameter of the interior surface of the upper portion such that an annular gap is defined therebetween.

12. The cap of claim 10, wherein the first perimeter portion is in a plane that is substantially perpendicular to the central axis.

13. The cap of claim 10, wherein the second perimeter portion spans greater than 45° around the central axis through the cap.

14. The cap of claim 10, wherein a notch is formed in the second perimeter portion.

15. The cap of claim 10, wherein an opening is defined radially-through the lower portion.

16. The cap of claim 10, further comprising an axial rib that protrudes radially inward from an inner surface of the lower portion, wherein the rib protrudes radially inward:
   a first radial distance for a first portion of an axial length of the rib; and
   a second radial distance for a second portion of the axial length of the rib, wherein the first portion of the axial length is positioned closer to the lower end of the lower portion than the second portion of the axial length, and wherein the first radial distance is less than the second radial distance.

17. The cap of claim 10, wherein an outer surface of the lower portion comprises a first diameter portion and a second diameter portion that define a ledge therebetween, and wherein the ledge is configured to be used to measure an amount of liquid in the cap.

18. A cap for a bottle, comprising:
   an upper portion configured to be positioned on an exterior of the bottle when the cap is engaged with the bottle; and
   a lower portion configured to be positioned at least partially within the bottle when the cap is engaged with the bottle, wherein a lower end of the lower portion includes a first perimeter portion and a second perimeter portion, wherein a first distance between the upper portion and the first perimeter portion is greater than a second distance between the upper portion and the second perimeter portion, and wherein the second perimeter portion comprises a radius of curvature that is oriented at an angle from about 20° to about 70° with respect to a central axis through the cap such that the second distance varies within the second perimeter portion; and
   an axial rib that protrudes radially inward from an inner surface of the lower portion, wherein the rib protrudes radially inward:
   a first radial distance for a first portion of an axial length of the rib; and
   a second radial distance for a second portion of the axial length of the rib, wherein the first portion of the axial length is positioned closer to the lower end of the lower portion than the second portion of the axial length, and wherein the first radial distance is less than the second radial distance.

\* \* \* \* \*